(12) United States Patent
Fleischhacker et al.

(10) Patent No.: US 10,780,668 B2
(45) Date of Patent: Sep. 22, 2020

(54) SURFACE PROTECTION FILM AND RELATED METHODS

(71) Applicant: 3M INNOVATIVE PROPERTIES COMPANY, St. Paul, MN (US)

(72) Inventors: Gerald F. Fleischhacker, White Bear Lake, MN (US); Ryan E. Marx, Rosemount, MN (US); Jason P. Pettengill, Huntington Beach, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 160 days.

(21) Appl. No.: 16/083,721

(22) PCT Filed: Mar. 10, 2017

(86) PCT No.: PCT/US2017/021713
§ 371 (c)(1),
(2) Date: Sep. 10, 2018

(87) PCT Pub. No.: WO2017/160609
PCT Pub. Date: Sep. 21, 2017

(65) Prior Publication Data
US 2019/0126584 A1    May 2, 2019

Related U.S. Application Data

(60) Provisional application No. 62/307,972, filed on Mar. 14, 2016.

(51) Int. Cl.
*B32B 3/26* (2006.01)
*B32B 5/18* (2006.01)
(Continued)

(52) U.S. Cl.
CPC ............ *B32B 3/266* (2013.01); *B32B 5/18* (2013.01); *B32B 7/12* (2013.01); *B32B 25/045* (2013.01);
(Continued)

(58) Field of Classification Search
CPC ....................................... B32B 3/266
See application file for complete search history.

(56) References Cited

U.S. PATENT DOCUMENTS

RE24,906 E    12/1960   Ulrich
3,239,478 A    3/1966   Harlan
(Continued)

FOREIGN PATENT DOCUMENTS

EP    2 166 052    3/2010
EP    2 889 349    7/2015
(Continued)

OTHER PUBLICATIONS

International Search Report for App. No. PCT/US2017/021713, dated Jun. 14, 2017, (5 pages).

*Primary Examiner* — Daniel H Lee
(74) *Attorney, Agent, or Firm* — Philip P. Soo

(57) ABSTRACT

The provided surface protection films include a plurality of layers in the following order: a first polymeric film that is exposed at a major surface of the surface protection film; a foamed adhesive; a second polymeric film; and a pressure-sensitive adhesive. The surface protective films withstand impacts and harsh outdoor conditions, and can be easily applied and removed while minimizing or eliminating the need to use personal protective equipment and volatile organic compounds.

14 Claims, 1 Drawing Sheet

(51) Int. Cl.
*B32B 7/12* (2006.01)
*B32B 25/04* (2006.01)
*B32B 27/06* (2006.01)
*B32B 27/40* (2006.01)
*B32B 27/08* (2006.01)
*B32B 27/20* (2006.01)
*B32B 27/30* (2006.01)

(52) U.S. Cl.
CPC ............ *B32B 27/065* (2013.01); *B32B 27/08* (2013.01); *B32B 27/205* (2013.01); *B32B 27/308* (2013.01); *B32B 27/40* (2013.01); *B32B 2250/04* (2013.01); *B32B 2250/24* (2013.01); *B32B 2264/101* (2013.01); *B32B 2266/0242* (2013.01); *B32B 2274/00* (2013.01); *B32B 2307/51* (2013.01); *B32B 2307/584* (2013.01); *B32B 2307/748* (2013.01); *B32B 2405/00* (2013.01); *B32B 2605/18* (2013.01)

(56) References Cited

U.S. PATENT DOCUMENTS

| | | |
|---|---|---|
| 3,562,356 A | 2/1971 | Nyberg |
| 3,700,633 A | 10/1972 | Wald |
| 3,935,338 A | 1/1976 | Robertson |
| 4,116,917 A | 9/1978 | Eckert |
| 4,156,673 A | 5/1979 | Eckert |
| 4,181,752 A | 1/1980 | Martens |
| 4,303,485 A | 12/1981 | Levens |
| 4,329,384 A | 5/1982 | Vesley |
| 4,330,590 A | 5/1982 | Vesley |
| 4,415,615 A | 11/1983 | Esmay |
| 4,952,650 A | 8/1990 | Young |
| 5,169,727 A | 12/1992 | Boardman |
| 5,376,430 A | 12/1994 | Swenson |
| 5,804,610 A | 9/1998 | Hamer |
| 6,103,152 A | 8/2000 | Gehlsen |
| 6,436,529 B1 | 8/2002 | Deeb |
| 6,586,483 B2 | 7/2003 | Kolb |
| 8,298,367 B2 | 10/2012 | Beger |
| 2016/0108291 A1* | 4/2016 | Masson .............. C09J 7/26 428/141 |

FOREIGN PATENT DOCUMENTS

| | | |
|---|---|---|
| JP | H08-270089 | 10/1996 |
| JP | H09-207260 | 8/1997 |
| JP | 2007-269835 | 10/2007 |
| WO | 2001/57152 | 9/2001 |
| WO | 2014/184499 | 11/2014 |
| WO | WO 2015/123007 | 8/2015 |

* cited by examiner

SURFACE PROTECTION FILM AND RELATED METHODS

CROSS REFERENCE TO RELATED APPLICATIONS

This application is a national stage filing under 35 U.S.C. 371 of PCT/US2017/021713, filed Mar. 10, 2017, which claims the benefit of US Provisional Patent Application No. 62/307,972, filed Mar. 14, 2016, the disclosures of which are incorporated by reference in their entirety herein.

FIELD OF THE INVENTION

Provided are adhesive-backed articles and methods thereof for protecting the surface of a substrate. More particularly, the provided adhesive-backed articles can be useful in protecting the surface of pressurized vehicles, such as commercial and military aircraft.

BACKGROUND

Aircraft surfaces are susceptible to damage caused by impacts with foreign objects at high speeds. Foreign object damage is especially prevalent on the underside of the aircraft and landing gear components and doors, which are located near the ground and commonly encounter rocks and debris during takeoff and landing. Military cargo aircraft can be especially vulnerable to this type of damage. Impacts on the external surfaces of aircraft are not so limited, however, and can occur at any time during a flight.

The need for protection from impacts is also not limited to aircraft applications. Consumer and commercial transport vehicles also deal with these problems, which can cause significant damage when such vehicles are travelling at high speeds and/or traversing unpaved surfaces.

Failure to address the problem of foreign object damage can result in erosion of painted surfaces, subjecting exposed metallic surfaces to corrosion and other detrimental environmental factors.

SUMMARY

Manufacturers have sought to alleviate damage due to foreign objects by applying coatings, protective tapes, or even installing metal panels to shield surfaces from damage. Metal panels can be very effective, but add significant additional weight and need to be frequently replaced as they incur damage over time. Sprayable coatings offer some degree of protection, but their effectiveness tends to be limited since substantial thicknesses are usually required to provide adequate impact protection. Foam-based protective tapes of sufficient thickness can provide a high level of impact protection and offer a reasonable combination of performance and convenience.

Yet, a problem with conventional protective tapes arises in specific applications that require removability. For example, the aircraft industry sometimes mandates periodic preventative maintenance procedures, which require disassembly, restoration, and re-assembly of the external panels of the aircraft. For this to occur, it is generally necessary to remove the protective tape. Conventional protective tapes designed for permanent application tend to fail cohesively (within the tape) when peeled from its substrate. Residual foam and adhesive left behind on the substrate can be painstakingly removed with the assistance of a volatile solvent, but this introduces further cost, labor, along with EHS (environmental, health, and safety) implications.

The provided adhesive-backed protective films offer a solution to this problem. In these films, a foamed adhesive core layer is confined between a pair of elastomeric film layers and a pressure-sensitive adhesive layer laminated to the outward-facing surface of one of the elastomeric film layers. The result is a protective film that withstands foreign object impacts and harsh outdoor conditions, and can be easily applied and removed while eliminating or minimizing the need for personal protective equipment and volatile organic compounds.

In a first aspect, a surface protection film is provided. The surface protection film comprises a plurality of layers, in the following order: a first polymeric film that is exposed at a major surface of the surface protection film; a foamed adhesive; a second polymeric film; and a pressure-sensitive adhesive.

In a second aspect, a method for protecting a vehicular substrate is provided, comprising: applying the aforementioned surface protection film to an outward-facing surface of the vehicular substrate during such time that protection is needed; and when protection is no longer needed, removing the surface protection film from the vehicular substrate by peeling the surface protection film away from the outward-facing surface at an angle of at least 35 degrees relative to the tangential plane of the outward-facing surface.

Figure 1:
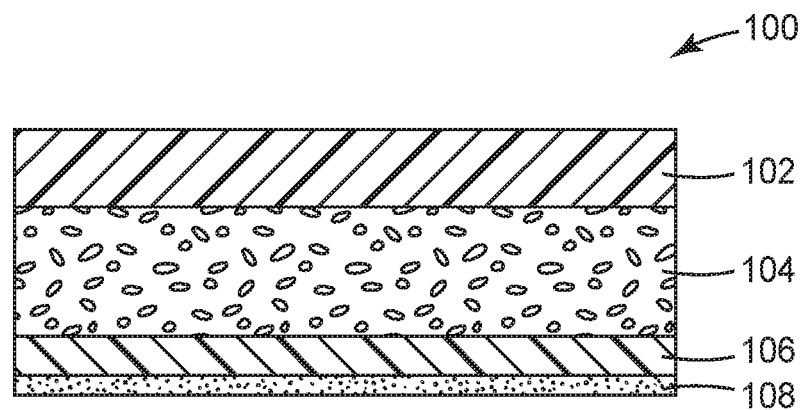
FIG. 1 is an cross-sectional view of a surface protection film according to one embodiment.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. Figures are not necessarily to scale.

DEFINITIONS

As used herein:

"diameter" refers to the longest dimension of a given object or feature;

"release liner", used interchangeably with the term "liner", refers to a flexible sheet which after being placed in intimate contact with pressure-sensitive adhesive surface may be subsequently removed without damaging the adhesive;

"substrate" refers to a surface to which the pressure-sensitive adhesive coating is applied for an intended purpose; and "tape" refers to a pressure-sensitive adhesive coating applied to a backing.

DETAILED DESCRIPTION

Layer Constructions

A surface protection film according to one exemplary embodiment is shown in cross-section in FIG. 1 and herein designated by the numeral 100. As shown, the protection film 100 is comprised of a plurality of layers, including but not limited to, a first polymeric film 102, a foamed adhesive 104, a second polymeric film 106, and a pressure-sensitive adhesive 108.

In FIG. 1, each of the aforementioned constituent layers is monolithic and continuous, with a generally uniform thickness. The first polymeric film 102 has a major surface exposed along one of the major surfaces of the overall protection film 100. Further, in this preferred construction, the first polymeric film 102 extends across and directly contacts the foamed adhesive 104, which extends across and directly contacts the second polymeric film 106, which in turn extends across and directly contacts the pressure-sensitive adhesive 108.

The first polymeric film 102 can have an average thickness of at least 150 micrometers, at least 200 micrometers, or at least 250 micrometers. The same film can have an average thickness of up to 600 micrometers, up to 500 micrometers, or up to 400 micrometers.

The second polymeric film 106 is optionally thinner than the first polymeric film 102 and can have an average thickness of at least 50 micrometers, at least 70 micrometers, or at least 90 micrometers. The second polymeric film 106 can have an average thickness of up to 300 micrometers, up to 200 micrometers, or up to 150 micrometers.

The foamed adhesive 104 can have an average thickness of at least 250 micrometers, at least 350 micrometers, or at least 450 micrometers. The foamed adhesive 104 can have an average thickness of up to 2500 micrometers, up to 1500 micrometers, or up to 1000 micrometers.

When used in combination with the first and second polymeric films 102, 106, the foamed adhesive 104 provides a high degree of foreign object impact protection by absorbing high speed impact energy. In conventional protection films, the foamed adhesive serves the secondary function of providing bond adhesion to the substrate (e.g., an exterior aircraft panel). By contrast, the additional polymeric film 106 and pressure-sensitive adhesive 108 enables these performance criteria—bond strength and impact protection—to be effectively decoupled from each other. By incorporating a somewhat less aggressive pressure-sensitive adhesive than the foamed adhesive, the provided protection film 100 can display both high impact performance and convenient removability.

The foamed adhesive 104 retains a strong adhesive bond with its neighboring layers while the three layers stretch in a manner that concentrates stress at the adhesive-substrate interface and facilitates a clean "peel-type" stretch release of the protection film 100 from the substrate. Advantageously, and unlike other stretch release mechanisms, such removal can be actuated by peeling the protection film 100 at an angle of greater than 35 degrees, greater than 40 degrees, or greater than 45 degrees, relative to a plane tangential to the outward-facing surface of the substrate. Peel release of these materials was observed to leave behind minimal or no substantial adhesive residue.

It is to be understood that the protection film 100 is not limited to the layers specifically mentioned and may include one or more additional optional layers interposed between any two layers described above, so long as such inclusion does not significantly impair the overall function or performance of the protection film 100. Such layers may be continuous or discontinuous, and may include for example pigmented layers, tie layers, primer layers, adhesive layers, and coextruded skin layers.

As another option, one or more layers may also be disposed on one or both major surfaces of the protection film 100. As an example, a sacrificial release liner (not shown) may be disposed on the pressure-sensitive adhesive 108 to facilitate handling and storage of the protection film 100. Such release liners need not be particularly restricted.

Figure 2:
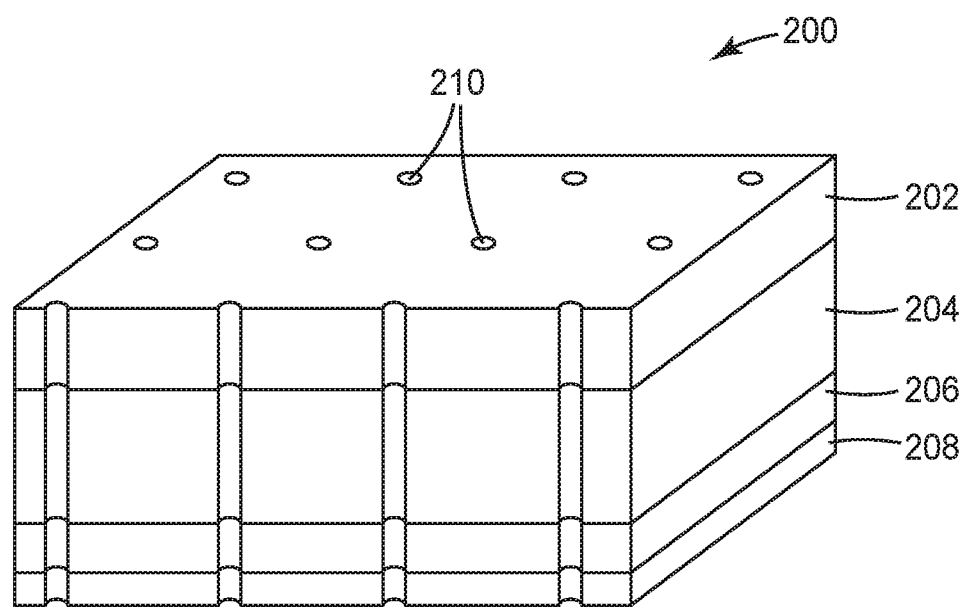
FIG. 2 is an isometric view of a surface protection film according to another embodiment.

FIG. 2 provides a three-dimensional view of a protection film 200 according to another embodiment. The protection film 200 has a configuration similar to that shown in FIG. 1 and further displays an additional optional feature—a plurality of perforations 210 distributed throughout the protection film 200.

The perforations 210, as shown, extend from one major surface of the protection film 200 to the other, thereby enabling fluid communication between opposing sides of the surface protection film. Here, the perforations 210 are evenly spread across the major surfaces of the protection film 200 and have a generally circular cross-section. Alternatively, non-uniform distributions of perforations are also possible. Moreover, the perforations can be made using a laser cutting process, allowing for perforations with non-circular cross-sections.

In some embodiments, the perforations 210 have an average diameter of at least 100 micrometers, at least 150 micrometers, at least 200 micrometers, at least 300 micrometers, or at least 350 micrometers. In some embodiments, the perforations have an average diameter of up to 3200 micrometers, up to 2500 micrometers, up to 2000 micrometers, up to 1500 micrometers, or up to 1000 micrometers.

The perforations can have an areal density of at least 6000 per square meter, at least 7000 per square meter, at least 8000 per square meter, at least 9000 per square meter, or at least 10,000 per square meter. In some embodiments, the perforations have an average diameter of up to 100,000 per square meter, up to 85,000 per square meter, up to 70,000 per square meter, up to 50,000 per square meter, or up to 40,000 per square meter.

Advantageously, the perforations 210 allow the protection film 200 to "breathe," which is beneficial in at least two respects. First, the perforations 210 allow gases to escape from beneath the protection film after installation. This can be especially important when applied to the walls of pressurized vessels, such as airplanes, which can have significant pressure differences between the inside and outside of the walls. Second, the perforation serve to provide air-bleedability, or egress of fluids such as air from the interface between the pressure-sensitive adhesive and the surface of the substrate. In both cases, the perforations 210 improve wet out and help prevent bubbles from forming beneath the protection film 200 after application.

Other options and features associated with the protection film 200 are analogous to those already described with respect to the protection film 100 and shall not be repeated here.

A more detailed description of the individual layers of the protection films 100, 200 is provided in the sections that follow.

Polymeric Films

It is preferred that the first polymeric film 102 has at least some range of elongation to facilitate peel removal of the protection film 100 from the underlying substrate on demand. In some embodiments, the first polymeric film 102 has a lengthwise elongation at break of at least about 100 percent, at least about 200 percent, or at least about 300 percent.

In preferred embodiments, the tensile strength at break of the first polymeric film 102 is sufficiently high so that the first polymeric film 102 will not rupture prior to or during removal of the pressure-sensitive adhesive 108 of the protection film 100 from the surface to which it has been adhered.

Examples of materials particularly suitable for the first polymeric film 102 of the protection film 100 include any material capable of being formed into a thin film layer and exhibiting elastomeric properties at ambient conditions. Elastomeric means that the material will substantially resume its original shape after being stretched. The elastomer can be both pure elastomers and blends with an elastomeric phase or content that will still exhibit substantial elastomeric properties at room temperature.

Suitable elastomers include such elastomeric polymers known to those skilled in the art as AB and ABA block copolymers. Star or radial block copolymers may also be suitable in the present invention. Elastomeric block copolymers are typically thermoplastic rubbers that have a rubbery midblock with at least two high glass transition temperature endblocks. Block copolymers are described, for example, in U.S. Pat. Nos. 3,562,356 (Nyberg et al.); 3,700,633 (Wald et al.); 4,116,917 (Eckert); and 4,156,673 (Eckert).

There are at least two basic classes of these polymers. In one class, the midblock is an unsaturated rubber. Examples of two types of polymers in this class are known to those skilled in the art as SBS and SIS block copolymers. In the other class, the midblock is a saturated olefin rubber. Examples of two types of polymers in this class are known to those skilled in the art as SEBS and SEPS block copolymers. SIS, SBS, SEBS, and SEPS block copolymers are useful in the present invention, with SIS block copolymers being preferred because of the elastomeric properties exhibited by these polymers.

Other preferred elastomeric compositions include polyurethane elastomers, made from either thermoplastic or thermoset polyurethanes. Other useful compositions include ethylene copolymers such as ethylene vinyl acetates, ethylene/propylene copolymer elastomers or ethylene/propylene/diene terpolymer elastomers. Blends of these elastomers with each other or with modifying non-elastomers are also possible. For example, up to 50 weight percent, but preferably less than 30 weight percent, of polymers may be added such as poly(alpha-methyl)styrene, polyesters, epoxies, polyolefins, e.g., polyethylene or certain ethylene/vinyl acetates, preferably those of higher molecular weight, or coumarone-indene resin.

The first polymeric film 102 preferably has a composition that is compatible with the adhesive or adhesives used in the construction. For example, an adhesive disposed thereon should form a strong bond with the surface of the first polymeric film 102, thereby avoiding undesirable adhesive transfer during stretch removal of the protection film 100 from a substrate. Another consideration is the problem of cross-contamination which could occur when the first polymeric film 102 is placed in contact with certain adhesives. In some preferred constructions, the first polymeric film 102 includes a sandwich construction where a protective polyolefin skin layer is disposed on each major surface of an elastomeric core layer. Protective layers can prevent tackifiers in an adhesive from migrating into the elastic film and causing the adhesive to lose tack over time.

Other aspects of elastomeric materials suitable for the first polymeric film 102 are described in U.S. Pat. Nos. 5,376,430 (Swenson et al.) and 6,436,529 (Deeb et al.).

The first polymeric film 102 can be made by any method of film forming presently known in the art, such as extrusion, co-extrusion, solvent casting, foaming, and the like. Use of a non-woven technology to form the first polymeric film 102 is also possible. The first polymeric film 102 can have any thickness so long as it possesses sufficient integrity to be easily processed and handled. Preferably, the first polymeric film 102 has a thickness ranging from about 10 micrometers to 250 micrometers. In the preferred range, thinner first polymeric films can sometimes provide easier removal than thicker ones.

Foamed Adhesives

The foamed adhesive 104, 204 is d, preferably a foam derived from an acrylic polymer or silicone polymer adhesive. Acrylic and silicone polymers are useful because of their ultraviolet light stability, conformability, and ability to distribute stress.

Useful acrylic polymers include, for example, acrylic acid esters of non-tertiary alcohols having from 1 to 20 carbon atoms. In some embodiments, the acrylic acid ester includes a carbon-to-carbon chain having 4 to 12 carbon atoms and terminates at the hydroxyl oxygen atom, the chain containing at least half of the total number of carbon atoms in the molecule.

Certain useful acrylic acid esters are polymerizable to a tacky, stretchable, and elastic adhesive. Examples of acrylic acid esters of nontertiary alcohols include but are not limited to 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Suitable acrylic acid esters of nontertiary alcohols include, for example, 2-ethylhexyl acrylate and isooctylacrylate.

To enhance the strength of the foam, the acrylic acid ester may be copolymerized with one or more monoethylenically unsaturated monomers that have highly polar groups. Such monoethylenically unsaturated monomer such as acrylic acid, methacrylic acid, itaconic acid, acrylamide, methacrylamide, N-substituted acrylamides (for example, N,N-dimethyl acrylamide), acrylonitrile, methacrylonitrile, hydroxyalkyl acrylates, cyanoethyl acrylate, N-vinylpyrrolidone, N-vinylcaprolactam, and maleic anhydride. In some embodiments, these copolymerizable monomers are used in amounts of less than 20% by weight of the adhesive matrix such that the adhesive is tacky at ordinary room temperatures. In some cases, tackiness can be preserved at up to 50% by weight of N-vinylpyrrolidone.

Especially useful are acrylate copolymers comprising at least 6% by weight acrylic acid, and in other embodiments, at least 8% by weight, or at least 10% by weight acrylic acid, each based on the total weight of the monomers in the acrylate copolymer. The adhesive may also include small amounts of other useful copolymerizable monoethylenically unsaturated monomers such as alkyl vinyl ethers, vinylidene chloride, styrene, and vinyltoluene.

Enhancement of the cohesive strength of the foam may also be achieved through the use of a crosslinking agent such as 1,6-hexanediol diacrylate, with a photoactive triazine crosslinking agent such as taught in U.S. Pat. Nos. 4,330,590 (Vesley) and 4,329,384 (Vesley et al.), or with a heat-activatable crosslinking agent such as a lower-alkoxylated amino formaldehyde condensate having $C_{1-4}$ alkyl groups—for example, hexamethoxymethyl melamine or tetramethoxymethyl urea or tetrabutoxymethyl urea. Crosslinking may be achieved by irradiating the composition with electron beam (or "e-beam") radiation, gamma radiation, or x-ray radiation. Bisamide crosslinkers may be used with acrylic adhesives in solution.

The polymer used in the foam can be prepared by any suitable polymerization method. Suitable polymerization methods include, but are not limited to, photopolymerization, thermal polymerization, or ionizing radiation polymerization. These methods can be carried out in solution, emulsion, or bulk without solvent. Bulk polymerization methods are described in U.S. Pat. No. 5,804,610 (Hamer et al.). Optionally, photopolymerizable monomers may be partially polymerized to a viscosity of from 1000 to 40,000 cps to facilitate coating. Alternatively, partial polymerization can be effected by heat. If desired, viscosity can also be adjusted by mixing monomers with a thixotropic agent such as fumed silica.

The weight average molecular weight of the polymer in the foam before crosslinking can be at least 600,000 g/mol, at least 800,000 g/mol, or at least 1,000,000 g/mol. Advantageously, the foam enables the surface protection film to display high adhesion performance over a wide range of temperatures (e.g., from −51° C. to 82° C.), such as that encountered by exterior-facing aircraft components.

Photopolymerization can take place in an inert atmosphere such as under a blanket of nitrogen or argon gas. Alternatively, an inert environment can be achieved by temporarily covering the photopolymerizable coating with a plastic film transparent to ultraviolet radiation, and irradiating the coating through the film. If the polymerizable coating is not covered during photopolymerization, the permissible oxygen content of the inert atmosphere can be increased by mixing into the photopolymerizable composition an oxidizable tin compound such as disclosed in U.S. Pat. No. 4,303,485 (Levens), which can enable relatively thicker coatings to be polymerized in air.

Optionally, the foam contains one or more additives. Such additives can include, for example, fillers, antioxidants, viscosity modifiers, pigments, tackifying resins, fibers, flame retardants, antistatic and slip agents, thermally conductive particles, electrically conductive particles, continuous microfibers, filaments, and mixtures thereof.

The polymer used to make the foam may be initially coated onto and polymerized against a flexible backing sheet (for example, a release liner) that has a low-adhesion surface from which the polymerized layer is readily removable and almost always is self-sustaining. If the opposite face of the backing sheet also has a low-adhesion surface, the backing sheet with its polymerized layer may be wound up in roll form for storage prior to assembly of the finished adhesive article.

In some embodiments, the foam is based on a silicone polymer that behaves as a pressure-sensitive adhesive. Suitable silicone polymers can include, for example, an MQ resin containing a resinous core and nonresinous polyorganosiloxane group terminated with a silicon-bonded hydroxyl group; a treated MQ resin, and a polydiorganosiloxane terminated with a condensation reactable group.

The foam used in the foamed adhesive may be an open cell foam, a closed cell foam, or a combination thereof. In some embodiments, the foam is a syntactic foam containing hollow microspheres, for example, hollow glass microspheres. Useful hollow glass microspheres include those having a density of less than 0.4 g/cm and having a diameter of from 5 to 200 micrometers. The microspheres may be clear, coated, stained, or a combination thereof. The microspheres typically comprise from 5 to 65 volume percent of the foam composition. Examples of useful acrylic foams thus made are disclosed in U.S. Pat. Nos. 4,415,615 (Esmay et al.) and 6,103,152 (Gehlsen et al.).

In some embodiments, foams may be formed by blending expanded polymeric microspheres into a polymerizable composition. In some embodiments, foams may be formed by blending expandable polymeric microspheres into a composition and expanding the microspheres. An expandable polymeric microsphere includes a polymer shell and a core material in the form of a gas, liquid, or combination thereof. Upon heating to a temperature at or below the melt or flow temperature of the polymeric shell, the polymer shell expands to form the microsphere. Suitable core materials include propane, butane, pentane, isobutane, neopentane, isopentane, and combinations thereof. The thermoplastic resin used for the polymer microsphere shell can influence the mechanical properties of the foam, and the properties of the foam may be adjusted by the choice of microsphere, or by using mixtures of different types of microspheres. Examples of commercially available expandable microspheres include those available under the trade designation Expancel™, from Akzo Nobel Pulp and Performance Chemicals AB, Sundsvall, Sweden. Methods of making foams containing expandable polymeric microspheres and particulars of these microspheres are described in U.S. Pat. No. 6,103,152 (Gehlsen et al.).

In some embodiments, the foamed adhesive is made in situ using a continuous extrusion process. When the polymer foam exits an extrusion die, expandable polymeric microspheres in the foam can remain unexpanded or, up to, partially expanded to enable the polymer foam to be used in a foam-in-place application. That is, the extruded foam can still be further expanded to a substantial degree at some later time in the application. The expandable microspheres in the extruded foam may retain most, if not all, of their expandability.

The reaction product of such an extrusion process can be comprised of thermoplastic expandable polymeric microspheres homogeneously distributed in the foamed adhesive, the thermoplastic expandable polymeric microspheres comprising unexpanded expandable polymeric microspheres, at least partially expanded expandable polymeric microspheres, or both.

Non-syntactic foams are also possible, and may be prepared by forming gas voids in a composition using a variety of mechanisms including, for example, mechanical mechanisms, chemical mechanisms, and combinations thereof. Useful mechanical foaming mechanisms include, for example, agitating (for example, shaking, stirring, or whipping the composition, and combinations thereof), injecting gas into the composition (for example, inserting a nozzle beneath the surface of the composition and blowing gas into the composition), and combinations thereof. Methods of making the foams with voids formed via a foaming agent are described in U.S. Pat. No. 6,586,483 (Kolb et al.).

In exemplary embodiments, the foamed adhesive is based on a foam having a foam density of from 320 kg/m$^3$ to 800 kg/m$^3$, from 400 kg/m$^3$ to 720 kg/m$^3$, or from 400 kg/m$^3$ to 641 kg/m$^3$.

Pressure-Sensitive Adhesives

Any known pressure-sensitive adhesive may be used so long as the overall protection film is provided with adequate bond strength and clean removability. Adhesives are typically selected based upon the type of substrate that they are to be adhered to. Classes of pressure-sensitive adhesives include acrylics, tackified rubber, tackified synthetic rubber, ethylene vinyl acetate, silicone polymers, and the like. Suitable acrylic and silicone adhesives are disclosed, for example, in U.S. Pat. Nos. 3,239,478 (Harlan), 3,935,338

(Robertson), 5,169,727 (Boardman), RE24,906 (Ulrich), 4,952,650 (Young et al.), 4,181,752 (Martens et al.), and 8,298,367 (Beger et al.).

Polymers useful for the acrylic pressure-sensitive adhesive layer includes acrylate and methacrylate polymers and copolymers. Such polymers can be made by polymerizing one or more monomeric acrylic or methacrylic esters of non-tertiary alkyl alcohols, with the alkyl groups having from 1 to 20 carbon atoms (for example, from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates can be used as well. Also useful are aromatic acrylates and methacrylates, for example, benzyl acrylate and cyclobenzyl acrylate. Optionally, one or more monoethylenically unsaturated co-monomers may be polymerized with the acrylate or methacrylate monomers. The particular type and amount of co-monomer is selected based upon the desired properties of the polymer.

One group of useful co-monomers includes those having a homopolymer glass transition temperature greater than the glass transition temperature of the (meth)acrylate (i.e., acrylate or methacrylate) homopolymer. Examples of suitable co-monomers falling within this group include acrylic acid, acrylamides, methacrylamides, substituted acrylamides (such as N,N-dimethyl acrylamide), itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkyl (meth)-acrylates, N,N-dimethyl aminoethyl (meth)acrylate, N,N-diethylacrylamide, beta-carboxyethyl acrylate, vinyl esters of neodecanoic, neononanoic, neopentanoic, 2-ethylhexanoic, or propionic acids, vinylidene chloride, styrene, vinyl toluene, and alkyl vinyl ethers. A second group of monoethylenically unsaturated co-monomers that may be polymerized with the acrylate or methacrylate monomers includes those having a homopolymer glass transition temperature ($T_g$) less than the glass transition temperature of the acrylate homopolymer. Examples of suitable co-monomers falling within this class include ethyloxyethoxyethyl acrylate ($T_g$=−71° C.) and a methoxypolyethylene glycol 400 acrylate ($T_g$=−65° C.; available from Shin Nakamura Chemical Co., Ltd., Wakayama, Japan, under the trade designation NK Ester AM-90G). Blends of acrylic pressure-sensitive adhesive polymers and rubber based adhesives in particular, elastomeric block copolymer-based adhesives (for example, tackified SIS or SBS based block copolymer adhesives), may also be used as an acrylic pressure-sensitive adhesive layer such as is described in PCT International Publication No. WO 01/57152 (Khandpur et al.).

The adhesive polymer can be dispersed in solvent or water and coated onto the release liner and dried, and optionally crosslinked. If a solvent-borne or water-borne pressure-sensitive adhesive composition is employed, then the adhesive layer generally undergoes a drying step to remove all or a majority of the carrier liquid. Additional coating steps may be necessary to achieve a smooth surface. The adhesives may also be hot melt coated onto the liner or microstructured backing. Additionally, monomeric pre-adhesive compositions can be coated onto the liner and polymerized with an energy source such as heat, UV radiation, or electron beam radiation.

As a further option, the pressure-sensitive adhesive can optionally include one or more additives. Depending on the method of polymerization, the coating method, and end user application, such additives may include initiators, fillers, plasticizers, tackifiers, chain transfer agents, fibrous reinforcing agents, woven and non-woven fabrics, foaming agents, antioxidants, stabilizers, fire retardants, viscosity enhancing agents, coloring agents, and mixtures thereof.

The rheology of the adhesive can be characterized by its Tangent Delta value, or the ratio of the loss shear modulus (G″) over the storage shear modulus (G′) of the adhesive material. In some embodiments, the adhesive displays a Tangent Delta value of up to 0.5, up to 0.48, up to 0.45, up to 0.42, up to 0.4, or up to 0.35, as measured by uniaxial dynamic mechanical analysis according to known methods at a frequency of 1 Hz under ambient conditions.

Not intended to be exhaustive, particular embodiments of the provided surface protection films and related methods are enumerated below:

1. A surface protection film comprising a plurality of layers, in the following order: a first polymeric film that is exposed at a major surface of the surface protection film; a foamed adhesive; a second polymeric film; and a pressure-sensitive adhesive.
2. The surface protection film of embodiment 1, wherein each of the first and second polymeric films comprises a polyurethane elastomer.
3. The surface protection film of embodiment 2, wherein the polyurethane elastomer comprises a thermoplastic polyurethane elastomer.
4. The surface protection film of any one of embodiments 1-3, wherein the foamed adhesive comprises a syntactic foamed adhesive.
5. The surface protection film of embodiment 4, wherein the syntactic foamed adhesive comprises a reaction product of one or more monomeric acrylic or methacrylic esters of non-tertiary alkyl alcohols, said alkyl alcohols having from 1 to 20 carbon atoms.
6. The surface protection film of embodiment 5, wherein the foamed adhesive further comprises thermoplastic expandable polymeric microspheres homogeneously distributed in the foamed adhesive, the thermoplastic expandable polymeric microspheres comprising unexpanded expandable polymeric microspheres, at least partially expanded expandable polymeric microspheres, or both.
7. The surface protection film of any one of embodiments 1-6, further comprising an array of perforations extending through the plurality of layers, the perforations providing fluid communication between opposing sides of the surface protection film.
8. The surface protection film of embodiment 7, wherein the perforations have an average diameter of from 100 micrometers to 3200 micrometers.
9. The surface protection film of embodiment 8, wherein the perforations have an average diameter of from 200 micrometers to 2000 micrometers.
10. The surface protection film of embodiment 9, wherein the perforations have an average diameter of from 350 micrometers to 1000 micrometers.
11. The surface protection film of any one of embodiments 7-10, wherein the perforations have an areal density of from 6000 to 100,000 per square meter.
12. The surface protection film of embodiment 11, wherein the perforations have an areal density of from 8,000 to 70,000 per square meter.
13. The surface protection film of embodiment 12, wherein the perforations have an areal density of from 10,000 to 40,000 per square meter.

14. The surface protection film of any one of embodiments 1-13, wherein the first polymeric film has an average thickness of from 150 micrometers to 600 micrometers.
15. The surface protection film of embodiment 14, wherein the first polymeric film has an average thickness of from 200 micrometers to 500 micrometers.
16. The surface protection film of embodiment 15, wherein the first polymeric film has an average thickness of from 250 micrometers to 400 micrometers.
17. The surface protection film of any one of embodiments 1-16, wherein the second polymeric film has an average thickness of from 50 micrometers to 300 micrometers.
18. The surface protection film of embodiment 17, wherein the second polymeric film has an average thickness of from 70 micrometers to 200 micrometers.
19. The surface protection film of embodiment 18, wherein the second polymeric film has an average thickness of from 90 micrometers to 150 micrometers.
20. The surface protection film of any one of embodiments 1-19, wherein the foamed adhesive has an average thickness of from 250 micrometers to 2500 micrometers.
21. The surface protection film of embodiment 20, wherein the foamed adhesive has an average thickness of from 350 micrometers to 1500 micrometers.
22. The surface protection film of embodiment 21, wherein the foamed adhesive has an average thickness of from 450 micrometers to 1000 micrometers.
23. The surface protection film of any one of embodiments 1-22, wherein the surface protection film is capable of being peeled from a substrate to which it is adhered without leaving substantial pressure-sensitive adhesive residue on the substrate.
24. A method for protecting a vehicular substrate comprising: applying the surface protection film of any one of embodiments 1-23 to an outward-facing surface of the vehicular substrate during such time that protection is needed; and when protection is no longer needed, removing the surface protection film from the vehicular substrate by peeling the surface protection film away from the outward-facing surface at an angle of at least 35 degrees relative to a tangential plane of the outward-facing surface.
25. The method for protecting the vehicular substrate of embodiment 24, wherein the vehicular substrate is an exterior panel of an aircraft.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

Unless otherwise noted, all reagents were obtained or are available from Sigma-Aldrich Company, St. Louis, Mo., or may be synthesized by known methods.

The following abbreviations are used to describe the examples:
° C.: degrees Centigrade
ft/min: feet per minute
g/m$^2$: grams per square meter
L: liter
lb/in: pound per inch
Kg/cm: Kilograms per centimeter
mm: millimeters
nm: nanometer
μm: micrometersimeters
mil: ¹⁄₁₀₀₀ inch
m/min: meters per minute
Pa: Pascal
psi: pounds per square inch
RH: relative humidity Materials 5925: An acrylic foam tape, obtained under the trade designation "VHB 5925" from 3M Company, St Paul, Minn.

8641: A perforated protective polyurethane tape, obtained under the trade designation "POLYURETHANE PROTECTIVE TAPE 8641, PERFORATED" from 3M Company.

8681: A 12 mil (304.8 μm) thick polyurethane film without adhesive, corresponding to precursor film obtained under the trade designation "8681HS POLYURETHANE PROTECTIVE TAPE" from 3M Company.

8664HS: A 6 mil (152.4 μm) thick polyurethane tape, obtained under the trade designation "8664HS POLYURETHANE PROTECTIVE TAPE" from 3M Company.

Test Methods

Peel Adhesion 7.6 cm by 20.3 cm aluminum panels were primed with "MIL-PRF-23377" obtained from PPG Industries, Pittsburgh, Pa., under the tradename DEFT 02Y40A, and then coated with "MIL-PRF-85285" topcoat, obtained from PPG under the tradename DEFT 99-GY-001. The primer was allowed to dry for 24 hours at 21° C. prior to applying the topcoat. The topcoat was applied about 1 year prior to application of the tapes. A 2.54 cm wide strip of the sample tape was applied over the painted surface and then rolled with a 2.0 kg roller two times in each direction. The resulting assembly was evaluated according to ASTM D3330, at an angle of 180 degrees at a rate of 12 inches/per minute.

Gravelometer Test Method

Tape samples were adhered to 24 mil (0.610 mm) thick bare aluminum panels and allowed to dwell at 21° C. for 7 days. The samples were then evaluated according to ASTM D3170 using 24 pints (11.36 L) of ½-inch (12.72 mm) river rock and a pressure of 70 psi (482.6 KPa) at an incident angle of 90°.

Drop Impact Test Method

Tape samples were adhered to 24 mil (0.610 mm) thick bare aluminum panels and allowed to dwell at 21° C. for 7 days. The samples were then evaluated according to ASTM D6905 using a four pound (4.81 Kg/m) weight dropped from a height of four feet (1.81 Kg). Each sample was impacted 2 times.

Example 5925 film was laminated between the non-adhesive surfaces of 8681 and 8664HS films, by means of a laminator operating at 5 ft/min (1.52 m/min) and a pressure of 60 psi (413.7 KPa) at 21° C. The material was then perforated with a laser to produce 10 mil (254.0 μm) holes spaced 0.25 inches (6.35 cm) apart.

Peel Adhesion

The Example and a Comparative (8641 film) were tested for peel adhesion as described above under the following conditions: (i) at 23° C. and 50% relative humidity after one day, (ii) at 71° C. dry heat after 7 days, and (iii) at 49° C. and 95% relative humidity after 7 days. Results are listed in Table 1.

TABLE 1

| Sample | Dwell Conditions (° C./% RH) | Time (Days) | Average Peel Adhesion (lb/in) | Failure type |
| --- | --- | --- | --- | --- |
| Example | 23/50 | 1 | 84.4 | Clean removal |
| Comparative (8641 Film) | 23/50 | 1 | 219.1 | Foam split |
| Example | 71/0 | 7 | 169.5 | Residual adhesive |
| Comparative (8641 Film) | 71/0 | 7 | 277.9 | Foam split |
| Example | 49/95 | 7 | 129.5 | Residual adhesive |
| Comparative (8641 Film) | 49/95 | 7 | 212.6 | Foam split |

Gravelometer

The Example and Comparative 8641 film were subjected to the Gravelometer Test. Both 8641 and EX-1 were rated as a 10A as called out in ASTM D3170, neither showing any chips or damage to the tape.

Drop Impact

The Example and Comparative 8641 film were subjected to the Drop Impact Test. Both 8641 and EX-1 showed no evidence of shattering, cracking, or chipping.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method for protecting a vehicular substrate comprising:
    applying a surface protection film to an outward-facing surface of the vehicular substrate during such time that protection is needed, the surface protection film comprising a plurality of layers, in the following order: a first polymeric film comprising a polyurethane elastomer that is exposed at a major surface of the surface protection film; a foamed adhesive; a second polymeric film; and a pressure-sensitive adhesive; and
    when protection is no longer needed, removing the surface protection film from the vehicular substrate by peeling the surface protection film away from the outward-facing surface at an angle of at least 35 degrees relative to a tangential plane of the outward-facing surface.

2. The method for protecting the vehicular substrate of claim 1, wherein the vehicular substrate is an exterior panel of an aircraft.

3. The method of claim 1, wherein each of the first and second polymeric films comprises a polyurethane elastomer.

4. The method of claim 3, wherein the polyurethane elastomer comprises a thermoplastic polyurethane elastomer.

5. The method of claim 1, wherein the foamed adhesive comprises a syntactic foam.

6. The method of claim 5, wherein the foamed adhesive comprises a reaction product of one or more monomeric acrylic or methacrylic esters of non-tertiary alkyl alcohols, said alkyl alcohols having from 1 to 20 carbon atoms.

7. The method of claim 6, wherein the foamed adhesive further comprises thermoplastic expandable polymeric microspheres homogeneously distributed in the foamed adhesive, the thermoplastic expandable polymeric microspheres comprising unexpanded expandable polymeric microspheres, at least partially expanded expandable polymeric microspheres, or both.

8. The method of claim 1, further comprising an array of perforations extending through the plurality of layers, the perforations providing fluid communication between opposing sides of the surface protection film.

9. The method of claim 8, wherein the perforations have an average diameter of from 100 micrometers to 3200 micrometers.

10. The method of claim 8, wherein the perforations have an areal density of from 6000 to 100,000 per square meter.

11. The method of claim 1, wherein the first polymeric film has an average thickness of from 150 micrometers to 600 micrometers.

12. The method of claim 1, wherein the second polymeric film has an average thickness of from 50 micrometers to 300 micrometers.

13. The method of claim 1, wherein the foamed adhesive has an average thickness of from 250 micrometers to 2500 micrometers.

14. The method of claim 1, wherein peeling the surface protection film away from the outward-facing surface does not leave any substantial pressure-sensitive adhesive residue on the substrate.

* * * * *